United States Patent [19]
Schroth

[11] Patent Number: 5,234,181
[45] Date of Patent: Aug. 10, 1993

[54] SAFETY BELT

[75] Inventor: Karl-Jürgen Schroth, Soest, Fed. Rep. of Germany

[73] Assignee: Carl F. Schroth GmbH, Arnsberg, Fed. Rep. of Germany

[21] Appl. No.: 889,449

[22] Filed: May 27, 1992

[30] Foreign Application Priority Data

May 28, 1991 [DE] Fed. Rep. of Germany ....... 4117405

[51] Int. Cl.$^5$ .............................................. B64D 11/06
[52] U.S. Cl. ............................ 244/122 B; 244/122 R; 280/806; 297/479; 297/480
[58] Field of Search ................... 244/122 B, 122 R; 280/806, 805; 297/471, 472, 479, 480

[56] References Cited

U.S. PATENT DOCUMENTS

| | | | |
|---|---|---|---|
| 2,639,913 | 5/1953 | Reynolds | 244/122 B |
| 4,023,427 | 5/1977 | Beier | 280/806 X |
| 4,200,308 | 4/1980 | Irwin | 297/480 X |
| 4,435,000 | 3/1984 | Chiba et al. | 280/806 |
| 4,881,781 | 11/1989 | Borlinghaus et al. | 280/806 X |
| 5,024,391 | 6/1991 | Zygutis et al. | 280/806 X |

Primary Examiner—Joseph F. Peters, Jr.
Assistant Examiner—Christopher P. Ellis
Attorney, Agent, or Firm—Anderson, Kill, Olick & Oshinsky

[57] ABSTRACT

A seat belt for a pilot seat or flight attendant seat in an aircraft includes a belt tightener with a reversible energy storage member in the form of a helical compression spring and a rod-shaped energy converter coupled to the energy storage member. The energy converter is at least indirectly connected to a belt member of the seat belt. After the belt member has been tightened and the energy converter has been displaced as a result with an at least partial regeneration of the energy storage member, a cutting chisel penetrates the surface of the energy converter and dampens the movement of the belt member. A renewed activation of the energy storage member after the deceleration phase is prevented by the penetration of a clamping edge of a clamping member in the surface of the energy converter.

4 Claims, 5 Drawing Sheets

SAFETY BELT

BACKGROUND OF THE INVENTION

Field of the Invention

The present invention relates to a seat belt for a pilot seat or flight attendant seat in an aircraft. The safety belt includes at least one belt member with a belt tightener.

Description of the Related Art

It is well known that when the forward movement of a vehicle is suddenly decelerated, a passenger who wears a seat belt is held back with a time delay relative to the deceleration of the vehicle. Consequently, until the seat belt is tightened and the passenger is held back as a result, the vehicle has traveled a longer distance than is available to the passenger as a displacement distance in the direction of movement of the vehicle.

The realization described above resulted in the development of a safety belt with a belt tightener. The belt tightener may be a linear tightener or rotary tightener. In this safety belt with belt tightener, appropriately constructed sensors effect immediately at the beginning of a deceleration the activation of a pretensioned spring force and/or of a pyrotechnical unit. As a result, the safety belt is pulled with initial loading tightly against the body of the passenger before the passenger can carry out a relative movement to the vehicle cell. This makes it possible to subject the movement of the passenger approximately to the deceleration pattern of the vehicle cell. This, in turn, results in a significant reduction of the biomechanical load acting on the passenger.

Since the dynamic effectiveness must today be demonstrated also for belt systems and passenger seats used in aircraft, it has been surprisingly found that the increased load values which in the past have been determined merely by computation have not been assumed sufficiently high enough because of the time delay of the deceleration of the vehicle relative to the deceleration of the passenger. This leads to the problem that the load values of the belt attachments or fastening points of the passenger seats in the aircraft which had initially been determined only in tests, are higher than the structurally required strengths of the aircraft cells. Accordingly, it is not possible to use safety belts with belt tighteners without structurally changing the passenger seats and/or the vehicle cell. However, changing the construction of aircraft components would be unacceptably expensive.

SUMMARY OF THE INVENTION

Therefore, starting from a safety belt of the type described above, it is the object of the present invention to provide a safety belt for a pilot seat or flight attendant seat in which without requiring structural changes of the vehicle cell the peak decelerations which are undesirable for reasons of protection of the vehicle passengers do not lead to an impermissible load acting on the attachment points on the aircraft cell.

In accordance with the present invention, the belt tightener includes a reversible energy storage means which, in turn, includes an energy converter which is deformable during the regeneration of the energy storage means by a deforming element which is supported at least indirectly by the vehicle cell as an abutment, wherein the deformed energy converter can be fixed in its position by means of a clamping member when the energy storage means is at least partially regenerated.

The above-described solution according to the present invention takes particularly into account the special requirements of foldable seat members of flight attendant seats. In this case, when the safety belts are used due to a substantial deceleration, the seat members must be foldable into the vertical to such an extent that the cross-sectional areas of the escape route to the emergency exits are fully maintained. The narrow spatial conditions and a weight which is as low as possible are taken into account initially by utilizing a reversible energy storage means as a damping means in lightweight construction. In addition, this damping is superimposed in a supplemental manner by the energy converter which is integrated in the belt tightener and is coupled to the energy storage means. Because of this integration, the structural size of the energy converter can also be minimized because the forces of the spring characteristic of the energy storage means are already up to 30% of the forces of the energy converter.

In practice, the above-described result is achieved by utilizing as a portion of the damping action the energy required for regenerating the energy storage means which is entirely or partially untightened at the beginning of a substantial deceleration. As a result, it is prevented that, after the end of the deceleration and the utilization of the reversible energy storage means for the energy conversion, the energy storage means again releases the energy introduced during the deceleration. The advantage of this solution is the fact that the deformation forces can be reduced by the amount which is required for the renewed tightening of the reversible energy storage means. Moreover, these low deformation forces make it possible that relatively soft and additionally relatively lightweight materials, such as, aluminum or plastic materials, can be used for the energy converter. Also, the energy converter does not have to be additionally used as a support element for anchoring the belt member because the energy storage means and the support means thereof can assume this function. Thus, the energy converter only has to carry out the damping action. Consequently, the energy converter can be arranged on the side of the energy storage means which faces the belt member as well as on the side which faces away from the belt member.

The energy converter can be constructed as a supporting connecting member between the belt member and the energy storage means or also as a non-supporting casing of such a connecting member. It is also conceivable that the energy converter is a component of a fitting for fastening the belt member to the vehicle cell or to the seat.

In addition, it is possible that the energy converter is provided with a profile which changes over the entire damping path, so that the area below the force curve in the addition with the area below the curve for regenerating the energy storing means forms a rectangle.

The deforming element which deforms the energy converter and rests at least indirectly against the vehicle cell as an abutment may have a chip-removing operation or an operation which merely deforms the material of the energy converter.

Particularly in dependence on the cross-section of the energy converter, the deforming element may penetrate the energy converter over a surface area or in a wedge shape. It may act on the deforming element at one point or at several points. The location relative to the energy converter can also differ, for example, in the sense of a canting-free self-centering of the energy converter.

The deformation can be effected, for example, in that at least one rib projecting from the surface of the energy converter is pressed away by a roller member or that a profile groove is rolled into the surface of the energy converter.

The clamping member ensures that after an at least partial regeneration of the energy storage means, this energy storage means can no longer effect a relative movement of the energy converter to the seat or to the vehicle cell.

It is also possible to have several clamping members which are positioned relative to the energy converter in such a way that the energy converter is automatically centered because of a force compensation between the clamping members.

In accordance with an advantageous feature of the present invention, the energy converter is either rod-shaped or disk-shaped. The rod-shaped construction usually is used in a linear tightener and the disk-shaped construction is used in a rotary tightener. Both variations are placed under the influence of a chip-removing chisel. Consequently, the damping action is effected by the engagement of the chisel in the material of the energy converter. After at least partial regeneration of the energy storage means, the clamping member acts also on the surface of the energy converter and, thus, prevents the relative displacement of the energy converter to the chisel which would be possible by the tightened energy storage means.

In a disk-shaped energy converter and in the case of an accommodation in a rotary tightener, the chip-removing procedure occurs at the circumference of the energy converter. It is possible to construct the chisel in such a way that the diameter of the energy converter is continuously reduced in layers. The chisel can also be constructed in such a way that after a full rotation of the energy converter, the cutting edge of the chisel moves closer to the center of the energy converter and, consequently, at least one additional full rotation of the energy converter is available for removing another chip. As the diameter of the energy converter is reduced, the force required for the chip-removing procedure naturally becomes smaller. However, this result can be eliminated by tilting the chisel, so that the cutting edge of the chisel acts at a steeper angle relative to the energy converter and, thus, essentially the same chip-removing forces have to be applied in spite of a smaller diameter.

In accordance with a particularly advantageous feature of the present invention, the deforming element is formed by a pivoting chisel which in a readiness position of the energy storage means is locked by means of a clamping lever and rests with frictional engagement under the force of the spring against the energy converter, and which in the position of operation of the energy storage means penetrates into the material of the energy converter. The pivoting axes of the pivoting chisel and of the clamping lever extend transversely of the rod-shaped energy converter or parallel to the axis of a disk-shaped energy converter. The pivoting chisel is preferably constructed L-shaped, wherein the pivoting axis is located in the point of intersection of the two sides of the L-shaped chisel. The face of the short side directed toward the energy converter is constructed as the cutting edge of the chisel. The end face of the longer side has a recess in which the clamping edge of the clamping lever rests in the readiness position. The pivoting axis of the clamping lever is located in the end portion facing away from the clamping edge. The pivoting chisel as well as the clamping lever are biased by means of a spring force, such that the rear of the cutting edge of the chisel is pressed with frictional engagement against the surface of the energy converter.

When the belt tightener is activated because of a sudden deceleration and the energy storage means is untightened as a result, the energy converter slides relative to the cutting edge of the pivoting chisel until the belt member is pulled tightly against the body. When a load is subsequently applied on the belt member by the passenger because of inertia in the direction of movement, the energy storage means is at least partially regenerated and the energy converter is moved in the other direction. Because of the frictional engagement between the rear of the cutting edge of the chisel and the surface of the energy converter, the pivoting chisel is pivoted with reinforcement by the spring force and the cutting edge of the chisel can penetrate in a chip-removing manner in the material of the energy converter. The displacement of the belt member and, thus, the passenger is dampened.

The bottom side between the short side and the long side of the pivoting chisel may be constructed in such a way that the chip separated from the material of the energy converter is conducted laterally from the energy converter and does not form an obstacle which would falsify the damping actions.

When the energy storage means is activated, the rear portion of the clamping edge of the clamping lever slides onto the surface of the energy converter without penetrating the material. Only when after the end of the deceleration and the energy conversion because of the at least partial regeneration of the energy storage means, a displacement of the energy converter in the other direction would begin, the clamping edge engages in the material of the energy converter and, thus, prevents its displacement relative to the seat or to the vehicle cell in the sense of a repeated, but now undesirable activation of the energy storage means.

The cutting edge of the pivoting chisel may be placed in the readiness position in a groove-like recess of the energy converter, so that the position of the belt member relative to the fitting is fixed during the normal use of the safety belt.

In accordance with another advantageous feature of the present invention, the chip-removing deforming element is constructed as a tooth-like or cutting edge-like chisel component of a rocker member. In the readiness position of the energy storage means, the deforming element rests biased by a spring force against the surface of the energy converter in a frictionally engaging manner. In the operating position of the energy storage means, the deforming element penetrates in the material of the energy converter and with its chisel edge is spaced frontally opposite a clamping edge which also forms a component of the rocker member.

In accordance with a first variation, the rocker member is approximately L-shaped in a side view. It may also be constructed U-shaped in cross-section. The wedge-shaped end of the long side is located in the readiness position clamped between a stationary support and the surface of the energy converter. The cutting edge of the chisel which is also located at this location is slightly inclined relative to the surface of the energy converter. The short L-shaped side has a recess in its end face which is engaged by a transversely extending locally fixed bolt. A tongue-type spring fastened on the support presses against the end face of the short side and holds the rocker member in the readiness position. The clamping edge arranged underneath the recess for the fixing bolt is located at a distance from the surface of the energy converter.

When the reversible energy storage means of the energy converter is moved relative to the cutting edge of the chisel, the latter remains in its readiness position. Thus, it is held in position by the support, on the one hand, and by the fixing bolt, on the other hand. The rear portion of the chisel slides on the surface of the energy converter.

After the end of the tightening procedure and the displacement of the energy converter in the opposite direction with an at least partial regeneration of the energy storage means, the long side of the rocker member travels further below the support because of the friction of the rear portion of the cutting edge of the chisel on the surface of the energy converter, so that the inclination of the cutting edge of the chisel is now steeper relative to the surface of the energy converter and can penetrate in a chip-removing manner into the material. During this displacement of the rocker member under the support, the recess in the short side loses contact with the fixing bolt and the rear portion of the clamping edge comes into contact with the surface of the energy converter. This movement is also reinforced by the force of the tongue-type spring.

When the damping action is concluded, the energy converter is at least partially regenerated and tends to pull the energy converter in the other direction. However, this is prevented because of the fact that the clamping edge now penetrates in the surface of the energy converter, while the fixing bolt comes to rest in a recess of the short side and, thus, the rocker member is pressed against the surface of the energy converter. In this manner, a relative displacement of the energy converter to the seat or to the vehicle cell is prevented.

Instead of the above-described cutting edge of the chisel and the clamping edge, in accordance with a second variation the same operation may be obtained by a narrow chisel tooth and a clamping tooth which are components of a, for example, narrow web-like deforming element. In this case, the support may be replaced by a guide bolt which engages in a groove in the end face of the long side of the rocker member. The guide bolt extends parallel to the fixing bolt.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DESCRIPTION OF THE PREFERRED EMBODIMENT

Figure 1:
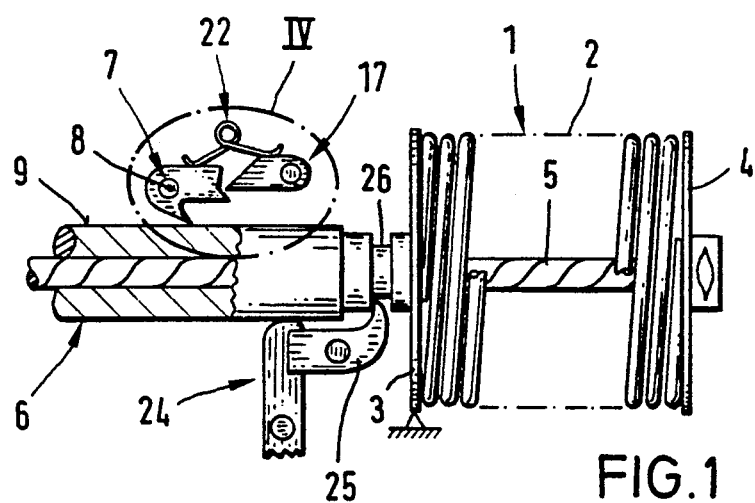
FIG. 1 is a side view of a linear tightener with an energy converter in the readiness position.
Figure 2:
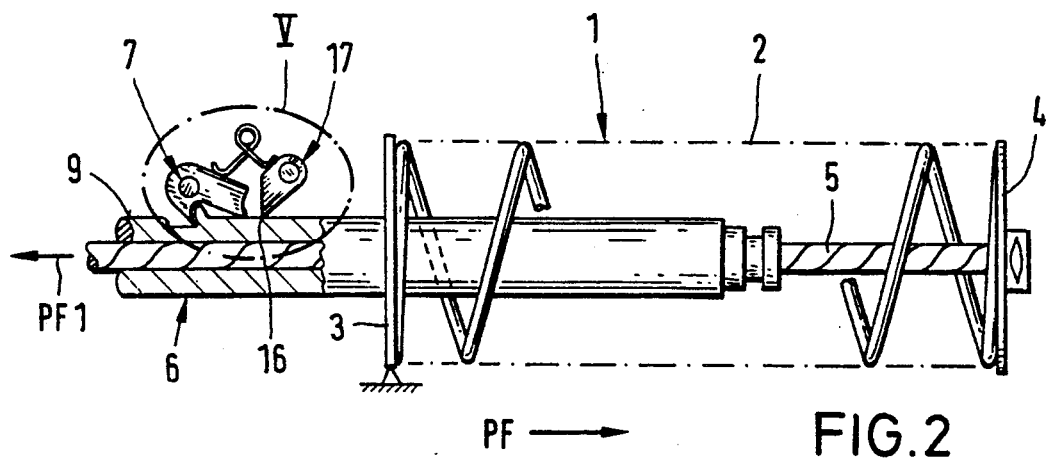
FIG. 2 shows the linear tightener of FIG. 1 after a belt tightening.
Figure 3:
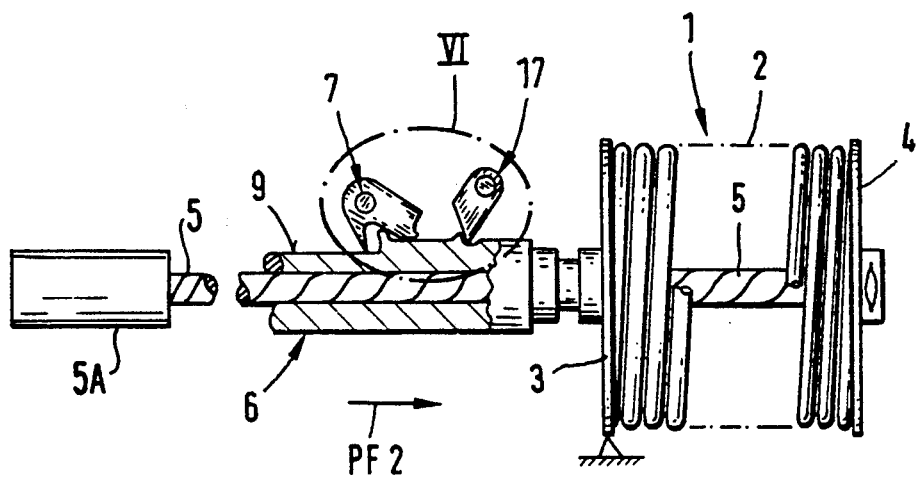
FIG. 3 shows the linear tightener and the energy converter of FIG. 1 at the end of a deceleration phase.

FIGS. 1-3 of the drawing show a linear tightener for a suspender-type seat belt, not shown in detail, for a flight attendant seat in an aircraft.

The linear tightener 1 includes an energy storage means composed of a helical compression spring 2. The helical compression spring 2 is mounted between a stationary disk 3 and a disk 4 which is displaceable relative to disk 3. A wire rope 5 is anchored on the disk 4. The wire rope 5 extends axially through the helical compression spring 2 and is fastened with its other end, to a belt member (5A) of the suspender-type seat belt.

The wire rope 5 further extends through a tubular energy converter 6 of aluminum. The energy converter 6 is not movable relative to the wire rope 5. Accordingly, wire rope 5 and energy converter 6 carry out common movements in longitudinal direction thereof.

Figure 4:
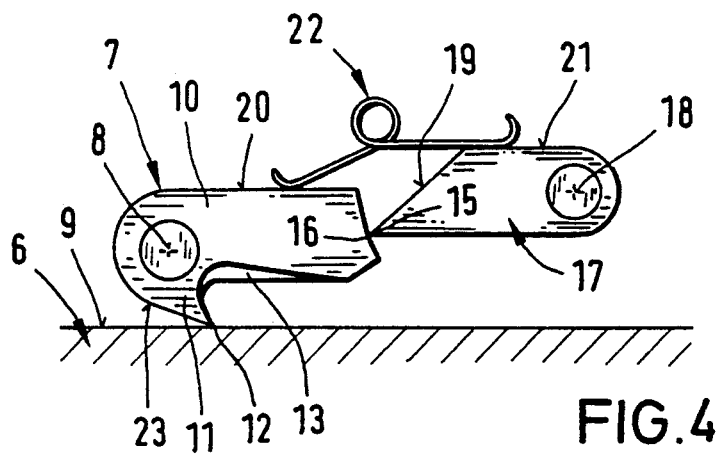
FIG. 4 shows, on a larger scale, the detail IV of FIG. 1.
Figure 5:
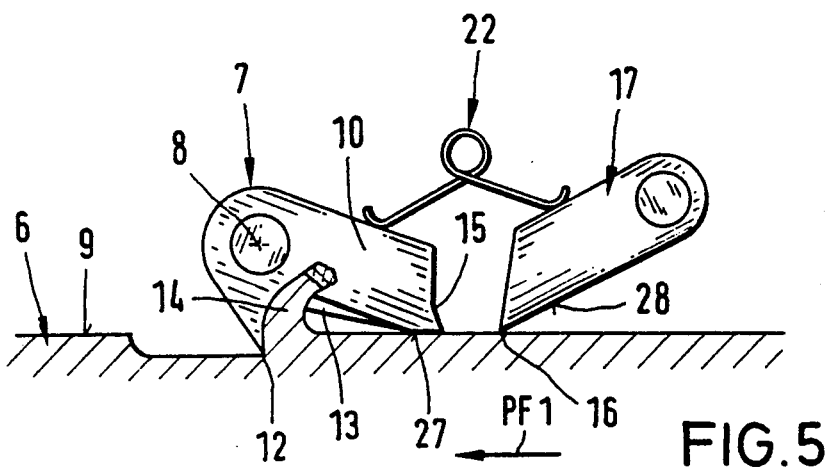
FIG. 5 shows, on a larger scale, the detail V of FIG. 2.
Figure 6:
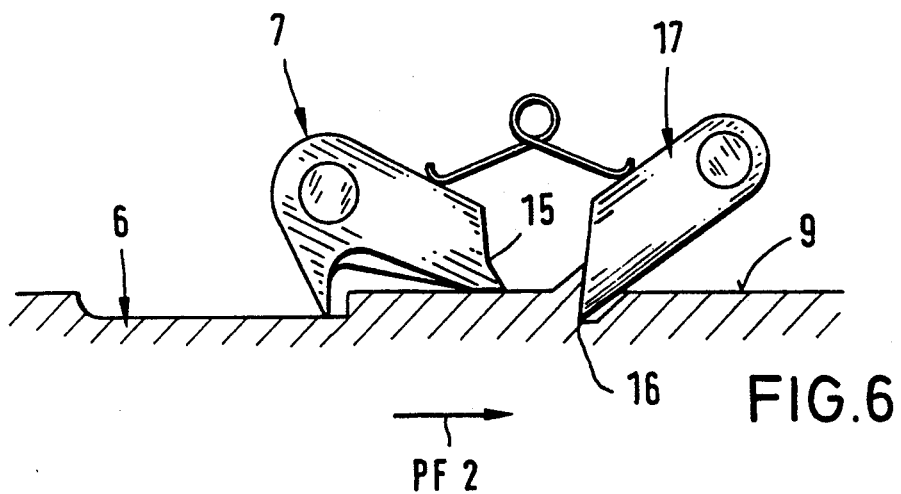
FIG. 6 shows, on a larger scale, the detail VI of FIG. 3.

A deforming element 7 constructed as an L-shaped pivoting chisel is mounted above the energy converter 6 so as to be pivotable about an axis 8 which extends transversely of the longitudinal direction of the energy converter 6, see also FIGS. 4 to 6. The deforming element 7 has a long side 10 which, in the readiness position according to FIGS. 1 and 4, extends approximately parallel to the outer surface 9 of the energy converter 6, and a shorter side 11 with a chisel cutting edge 12. The axis 8 is located in the point of intersection of the long side 10 with the short side 11.

The bottom side of the deforming element 7 is equipped with an inclined deflector surface 13 for chips 14, see FIGS. 4 and 5.

The end face of the long side 10 is provided with a locking recess 15 which is engaged by the clamping edge 16 of a clamping lever 17. The pivoting axis 18 of the clamping lever 17 is located at the end facing away from the clamping edge 16. The pivoting axis 18 extends parallel to the axis 8 of the deforming element 7. The end face 19 facing away from the pivoting axis 18 of the clamping lever 17 is inclined.

The axes 8 and 18 of the deforming element 7 and the clamping lever 17, respectively, are provided stationary on the flight attendant seat.

As the drawing further shows, a spreading spring 22 acts on the sides 20 and 21 of the deforming element 7 and the clamping lever 17, respectively, which face away from the energy converter 6. The spreading spring 22 tends to pivot the deforming element 7 in clockwise direction and the clamping lever 17 in counterclockwise direction. In the readiness position according to FIGS. 1 and 4, this pivoting is prevented by the frictionally engaging contact of the rear portion 23 of the chisel cutting edge 12 on the surface 9 of the energy converter 6 and by the engagement of the clamping edge 16 of the clamping lever 17 in the locking recess 15 of the deforming element 7.

As FIG. 1 further shows, the readiness position of the linear tightener 1 is secured by a lever arrangement which is in operational connection with a sensor, not illustrated, which responds to a sudden deceleration.

Thus, when a sudden deceleration in the forward movement of the aircraft occurs, for example, during a so-called hard landing, the sensor reacts by causing a pivoting of the lever arrangement 25 in accordance with FIG. 1. The chip of the lever 25 leaves the circumferential groove 26 of the energy converter 6. As a result, the energy stored by the compressed helical compression spring 2 is released. The movable disk 4 is displaced under the influence of the helical compression spring 2 in accordance with arrow PF relative to the stationary disk 3, as shown in FIG. 2, and thereby pulls the wire rope 5 and through the wire rope 5 also the energy converter 6 toward the right as seen in FIG. 2. During this procedure, the rear portion 23 of the chisel cutting edge 12 slides on the surface 9 of the energy converter 6, as illustrated in FIGS. 1 and 4, and the belt member is pulled tightly against the body of the passenger. This tightening of the belt member immediately after the beginning of the deceleration results in a substantial adaptation of the deceleration of the passenger to the deceleration of the vehicle.

The load acting on the belt member after the tightening of the belt member causes the wire rope 5 and, thus, also the energy converter 6 to be displaced in direction of arrows PF1 in FIGS. 2 and 5 with an at least partial regeneration of the helical compression spring 2. Because of the displacement of the energy converter 6, the deforming element 7 which rests with frictional engagement against the surface 9 of the energy converter 6 is pivoted in accordance with the illustrations of FIGS. 2 and 5 about the axis 8, wherein the spreading spring 22 supports this movement. The chisel cutting edge 12 entering into the material of the energy converter 6 creates a chip 14 and consequently results in damping of the axial movement of the energy converter 6 and, thus, also in the load acting on the belt member by the passenger.

During the pivoting of the deforming element 7, the deforming element 7 and the clamping lever 17 lose contact, as illustrated in FIGS. 2 and 5, and a sliding surface 27 on the long side 10 of the deforming element 7 comes into sliding contact with the surface 9 of the energy converter 6 and the rear portion 28 of the clamping edge 16 of the clamping lever 17 comes into sliding contact with the surface 9.

In this connection, particularly FIG. 5 shows that the chip 14 separated from the material of the energy converter 6 by the chisel cutting edge 12 is deflected laterally at the deflector surface at the underside of the deforming element 7. As can be seen in FIG. 3, the helical compression spring 2 (energy storage means) is at least partially regenerated (tightened) again at the end of the deceleration phase. Since the load of the energy converter 6 in the direction of the arrows PF1 according to FIGS. 2 and 5 is now eliminated, the tightening force newly created in the helical compression spring 2 could cause the wire rope 5 and, thus, the energy converter 6 to be moved in the direction of arrows PF2 of FIGS. 3 and 6. This movement which would also eliminate the position of securing action of the passenger, is prevented by the fact that the clamping edge 16 penetrates in the surface 9 of the energy converter 6, as shown in FIGS. 3 and 6, and, consequently, a relative displacement of the energy converter 6 and of the belt member to the passenger seat or the vehicle cell is prevented.

Figure 7:
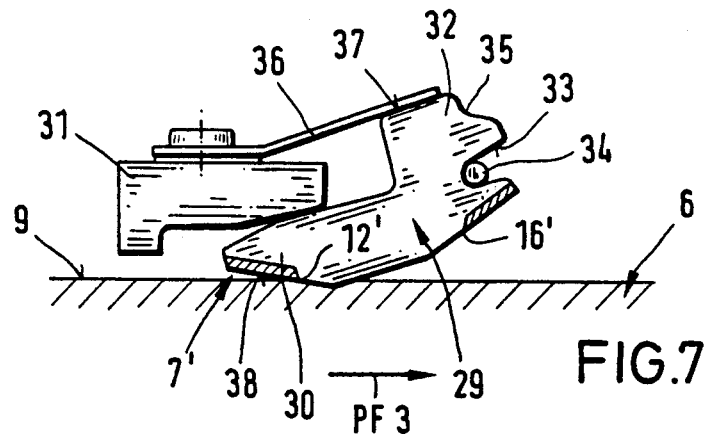
FIG. 7 is a side view, partially in vertical longitudinal section, of a rocker-shaped deforming element with supports in the readiness position.

In the embodiment illustrated in FIGS. 7 to 10, the deforming element 7' is constructed as a cutting edge-type chisel and is component of a rocker member 29 which is U-shaped in cross-section. The chisel cutting edge 12' is located at a distance from and frontally opposite a clamping edge 16 which is also component of the rocker member 29. In vertical cross-section, the rocker member is approximately L-shaped. The long side 30 of the rocker member 29 is wedge-shaped and engages in the readiness position of the helical compression spring 2 according to FIG. 7 between a stationary support 31 and the surface 9 of the energy converter 6. A locking groove 33 is provided in the end face of the short side 32. A stationary fixing bolt 34 engages in the locking groove 33. A recess 35 is provided above the locking groove 33. The readiness position according to FIG. 7 is reinforced by a tongue-type spring 36 which is fastened on the support 31 and presses against the end face 37 of the short side 32.

When the helical compression spring 2 is activated in accordance with FIG. 2, the energy converter 6 carries out a relative movement to the rocker member 29 according to arrow PF3 in FIG. 7. The rear portion 38 of the chisel cutting edge 12' then slides on the surface 9 of the energy converter 6. The fixing bolt 34 is tightly pressed into the locking groove 33.

Figure 8:
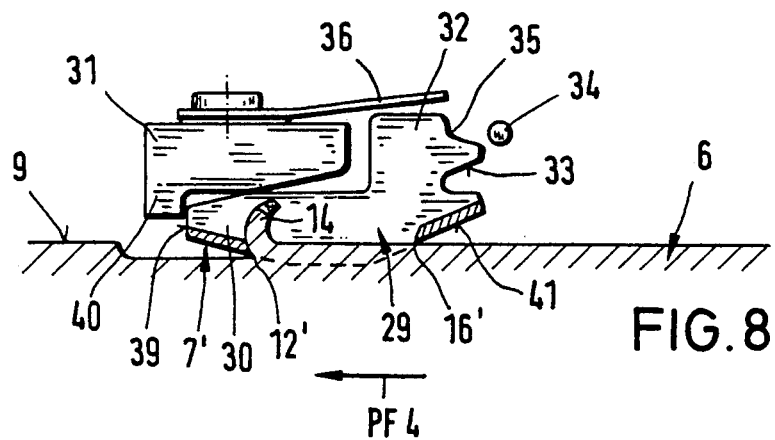
FIG. 8 shows the deforming element of FIG. 7 during the damping phase.

As described in connection with FIGS. 2 and 5, after the end of the tightening procedure, the displacement of the energy converter 6 in the direction of arrow PF4 of FIG. 8 takes place. Because of the frictionally engaging contact of the rear portion 38 of the chisel cutting edge 12', on the one hand, and under the pressing force of the tongue-type 36, on the other hand, the rocker member 29 is displaced, such that the free end of the long side 30 moves until it contacts the end face 39 of the end 40 of the support 31 and extends into the region between the support 31 and the surface 9 of the energy converter 6, and the fixing bolt 34 slides out of the locking groove 33, as shown in FIG. 8. Simultaneously, the chisel cutting edge 12 cuts a chip 14 out of the material of the energy converter 6 and, thus, causes the damping effect. The rear portion 41 of the clamping edge 16' is in frictional engagement with the surface 9 of the energy converter 6.

Figure 9:
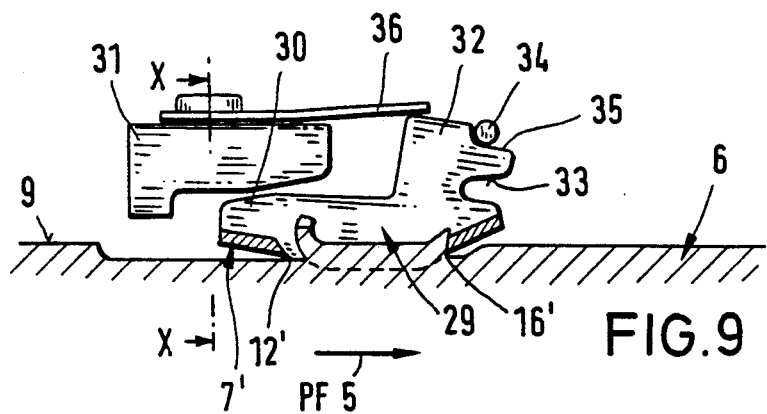
FIG. 9 shows the deforming element of FIGS. 7 and 8 at the end of the deceleration phase.
Figure 10:
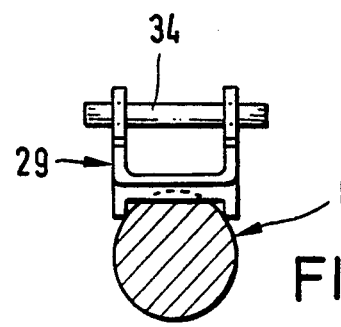
FIG. 10 is a vertical sectional view taken along sectional line X—X of FIG. 9 without the support.

When the deceleration phase is concluded and, as shown in FIG. 3, the helical compression spring 2 is again at least partially regenerated and is again capable of moving the energy converter 6 in accordance with arrow PF5 of FIG. 9 relative to the stationary support 31, the damping edge 16' now penetrates in the surface 9 of the energy converter 6 and prevents this movement. In this situation, pivoting of the rocker member 29 is prevented because the fixing bolt 34 is now located in the recess 35 above the locking groove 33. As illustrated in FIG. 10, a rod-shaped energy converter 6 having a round cross-section is preferably used in this embodiment.

Figure 11:
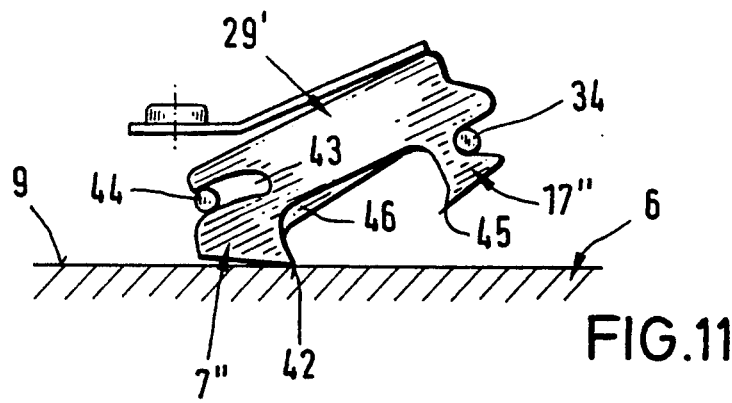
FIG. 11 is a side view, partially in vertical longitudinal section, of a second embodiment of a rocker-like deforming element.

FIG. 11 shows a rocker member 29' in which the deforming element 7" as well as the clamping member 17" are tooth-shaped and the rocker member 29' proper is essentially narrow and web-shaped.

This rocker member 29' also performs the movements described with respect to FIGS. 7 to 9, however, instead of the interaction of the long side 30 of the rocker member 29 in accordance with the embodiment of FIGS. 7 and 9 with the support 31 and the surface 9 of the energy converter 6, a groove 43 is provided above the chisel tooth 42, wherein the groove 43 interacts with a guide bolt 44 which extends parallel to the fixing bolt 34.

As can also be seen in FIG. 11, an inclined surface 46 for deflecting a chip is provided underneath the web portion between the chisel tooth 42 and the clamping tooth 45.

Figure 12:
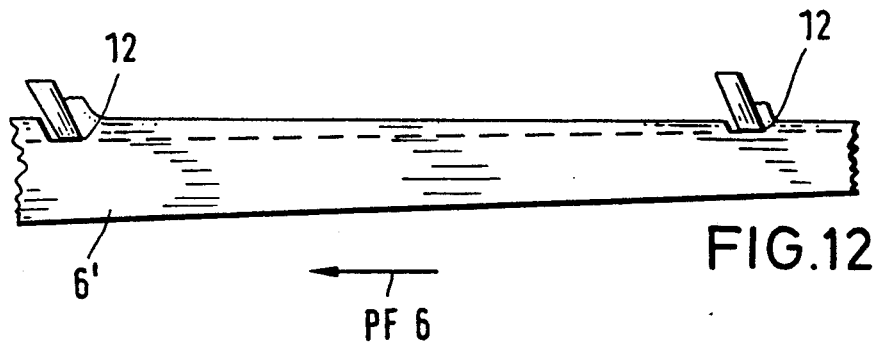
FIG. 12 is a side view of another embodiment of an energy converter.

FIG. 12 of the drawing shows a rod-shaped energy converter 6' which has a cross-sectional area which changes over its length. It is apparent that when a relative movement of the energy converter 6' to the chisel cutting edge 12 according to arrow PF6 takes place, different forces are required for separating the chips from the material of the energy converter 6'.

Figure 14:
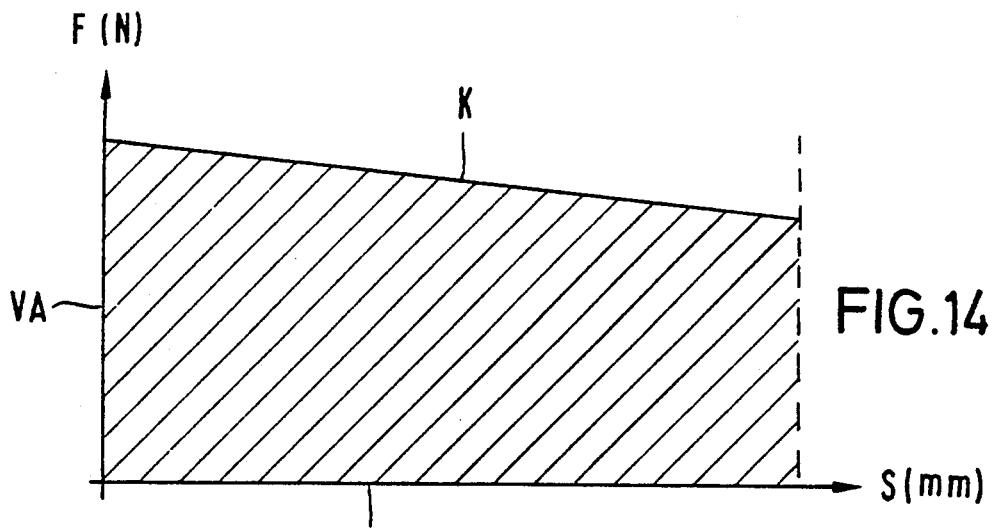
FIG. 14 is a force/distance diagram during the damping phase.

This movement is illustrated in the force/distance diagram according to FIG. 14, wherein the distance S is shown on the horizontal axis HA in millimeters and the cutting force F is shown on the vertical axis VA in Newton. The movement results in the straight, downwardly sloping curve K.

Figure 15:
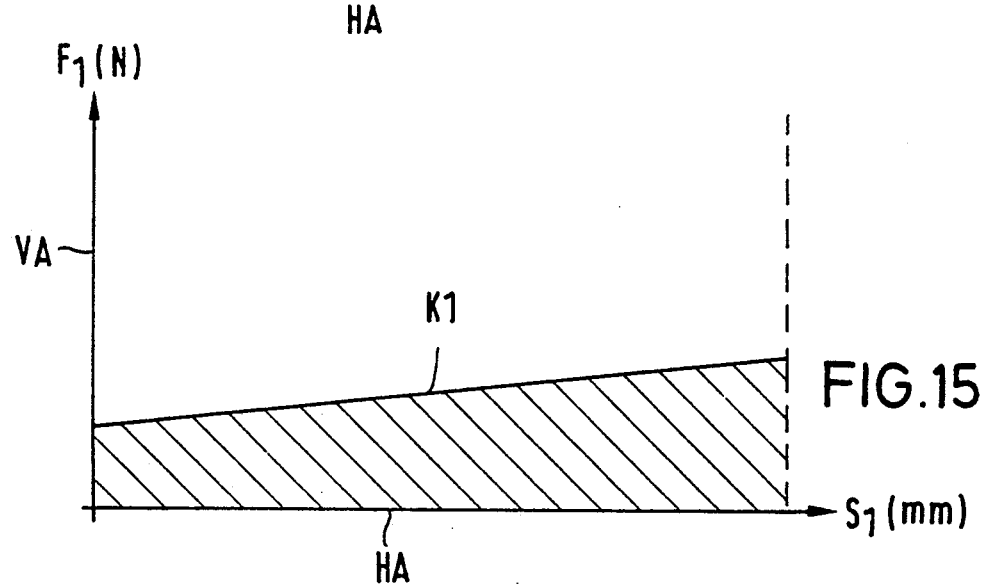
FIG. 15 is a force/distance diagram of the energy converter of the linear tightener of FIGS. 1-3.

FIG. 15 shows a force/distance diagram of the helical compression spring 2 of FIGS. 1-3 in the range of operation provided for the linear tightener 1 in the case of activation of the helical compression spring 2. Again, the distance S1 is shown on the horizontal axis HA in millimeters and the compressive force F1 is shown on the vertical axis VA in Newton. The movement results in the straight, upwardly sloping curve K1.

Figure 16:
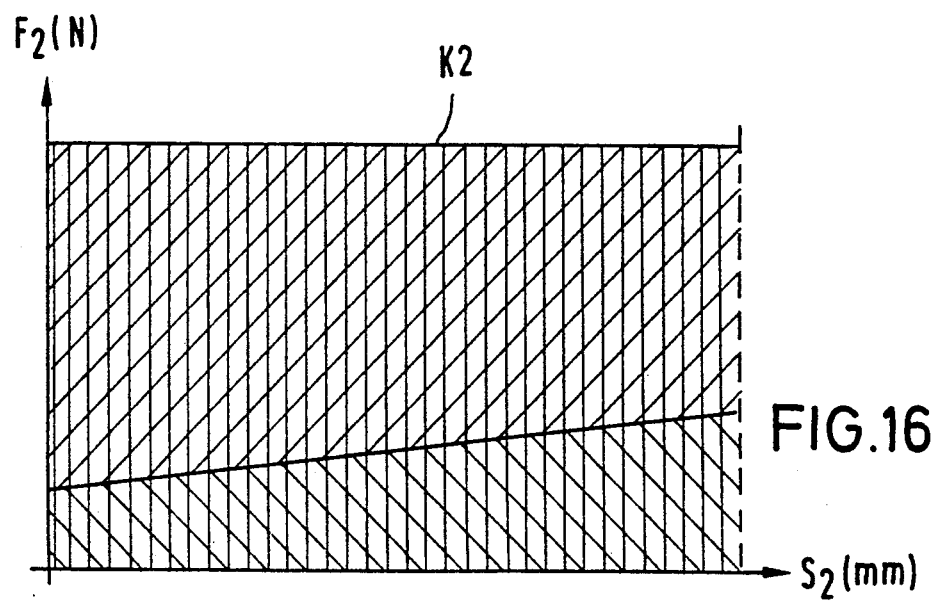
FIG. 16 is a diagram superimposing the force/distance diagrams of FIGS. 14 and 15.

When the curves K and K1 according to FIGS. 14 and 15 are superimposed, the resulting curve K2 is obtained as shown in FIG. 16 which essentially shows an essentially uniform type of force F2 in Newton over the entire distance S2 in millimeters.

Figure 13:
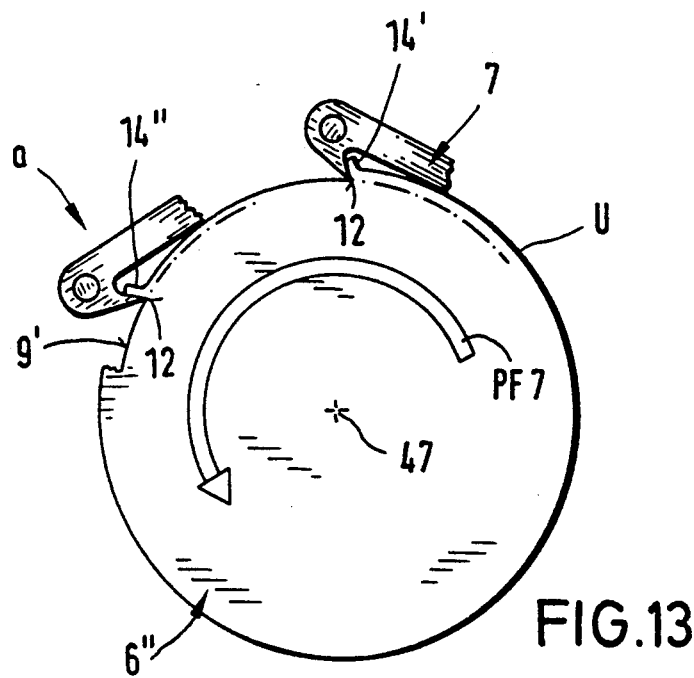
FIG. 13 shows a disk-shaped energy converter with a deforming element in two different positions of operation.

Finally, FIG. 13 shows a disk-shaped energy converter 6" as a component of a rotary tightener, not illustrated in detail. This energy converter 6" interacts with a chisel as the deforming element 7 and a clamping member 17, for example, of the type shown in FIGS. 4-6. For simplicity's sake, only the deforming element 7 is shown.

It can be seen in the drawing that the chisel-cutting edge 12 cuts a chip 14' at the circumference U when after tightening of the belt member, the latter is stressed by the passenger in such a way that the energy converter 6' rotates in the direction of arrow PF7 about the axis 47. The position A of the chisel cutting edge 12 after a full rotation of the energy converter 6" shows that the chisel cutting edge 12 is again penetrating into the surface 9' of the energy converter 6" and by separating a chip 14" creates a constant damping effect at least over another rotation.

The operation of the energy converter 6" according to FIG. 13 is otherwise identical to the operation of the energy converter 6 and 6' according to the embodiments of FIGS. 1-6 or 7-10, respectively.

While specific embodiments of the invention have been shown and described in detail to illustrate the inventive principles, it will be understood that the invention may be embodied otherwise without departing from such principles.

I claim:

1. A safety belt for a pilot seat or flight attendant seat having a vehicle cell, the safety belt including at least one belt member with a belt tightener, the belt tightener including a reversible energy storage means with an energy converter, an element for deforming the energy converter during regeneration of the energy storage means, the deforming means being supported, at least indirectly, by the vehicle cell as an abutment and comprising a chisel capable of cutting chips from the surface of the energy converter to thereby dampen movement of the belt member, and clamping means for fixing the deformed energy converter in its position when the energy storage means is at least partially regenerated.

2. The safety belt according to claim 1, wherein the energy converter is one of rod-shaped and disk-shaped, and the clamping means engages the deformed energy converter for fixing it in its position with a time delay with respect to the chisel cutting a chip from the surface of the energy converter.

3. The safety belt according to claim 1, comprising a lever means for retaining the chisel in a predetermined position with respect to the energy converter in an initial position of the energy storage means, spring means for biasing the chisel into a frictional engagement against the energy converter, and means for pivotally supporting the chisel in a manner such that the chisel penetrates into the surface of the energy converter during at least partial regeneration of the energy storage means.

4. The safety belt according to claim 1, wherein the chisel is one of tooth-shaped and cutting edge-shaped and is a component of a rocket member, the clamping means comprising a clamping edge, which also forms part of the rocker member and is located on a side thereof facing the energy converter, the chisel having a chisel edge located on the same side of the rocker member as the clamping edge and in a spaced relationship to the clamping member, the safety belt further comprising spring means for biasing the chisel into a frictional engagement against the energy converter, and means for pivotally supporting the chisel in a manner such that the chisel penetrates into the surface of the energy converter during at least partial regeneration of the energy storage means.

* * * * *